Aug. 21, 1928.

J. A. SPENCER 1,681,912

LUBRICATING DEVICE

Filed Oct. 28, 1924

Inventor:
John A. Spencer,
by Roberts, Roberts & Cushman
Attys.

Patented Aug. 21, 1928.

1,681,912

UNITED STATES PATENT OFFICE.

JOHN A. SPENCER, OF REVERE, MASSACHUSETTS, ASSIGNOR TO SPENCER THERMOSTAT COMPANY, OF CAMBRIDGE, MASSACHUSETTS, A CORPORATION OF MASSACHUSETTS.

LUBRICATING DEVICE.

Application filed October 28, 1924. Serial No. 746,314.

This invention relates to the lubrication of bearings but more particularly to oil cups for automatically supplying oil to bearings in variable quantities according to the requirements.

In many instances oil is supplied to bearings from oil cups having manually adjustable means for regulating the flow according to the needs of service. This fulfills the needs satisfactorily if the amount of oil supplied is substantially constant over a given period of time, but obviously is impractical where the required amount varies frequently. It is extremely desirable automatically to regulate the flow to bearings where the amount of friction varies from time to time so that maximum efficiency may be obtained under all conditions.

Objects of the invention therefore are to provide thermostatic means to regulate the amount of oil supplied to bearing surfaces according to the needs thereof; and to provide temperature controlled means to regulate the amount of fluid flowing through a passage operable automatically at different predetermined temperatures.

In the illustrative embodiment of the invention shown—

Figures 1, 2, 3:
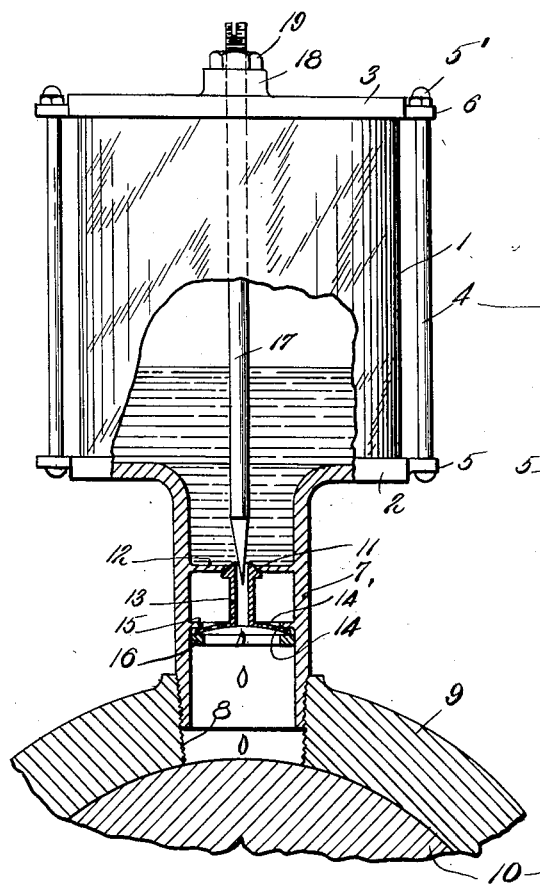
Fig. 1 is an elevation partly in section of an oil cup mounted on a bearing, showing the valve seated.
Fig. 2 is a view similar to Fig. 1 showing the valve unseated.
Fig. 3 is a plan view of the thermostatic disk and valve.

In the embodiment of the invention illustrated, the oil cup comprises a cylinder 1 of glass or other suitable material, the ends of which are received in the caps 2 and 3 which are held together by rods 4, extending through ears 5 and 6 integral with the outer periphery of the caps 2 and 3 respectively. The cap 3 is held in place by nuts 5' threaded on the ends of the rods 4 which permit the cap 3 to be removed to replenish the oil or for other reasons. The cap 2 is formed with a tubular projection 7 which constitutes the outlet for the oil cup and the outer end of the projection 7 is externally screw-threaded for engagement with the internal threads of an opening 8 in the bearing 9. Rotatable in the bearing 9 is a shaft 10 which receives lubricant from the oil cup, the oil flowing from the cylinder 1 through the outlet projection 7 and into the opening 8.

The amount of oil flowing from the oil cup is controlled by a valve 11 having a hollow bore arranged to seat upwardly in the outlet projection 7 against a seat 11' in a partition 12 which is integral with the projection. Integral with the valve 11 is a hollow stem 13, the end of which is connected to a thermostatic disk 14 having perforations 14'. The disk 14 is loosely mounted between an annular shoulder 15 formed on the outlet projection 7 and a ring 16 frictionally held against the internal wall of the projection.

The disk 14 is preferably bi-metallic, being made up of two materials such as iron and brass having different thermal co-efficients of expansion so that a change in temperature will cause unequal expansion and contraction of opposite faces of the disk. The disk 14 is normally cupped (as by swaging) in such direction that the component part having the higher coefficient of expansion is on the concave side. Consequently upon raising the temperature the unequal expansion of the materials forming the disk will cause a tendency to flatten the cupped surface until at a predetermined temperature a sudden curving in the opposite direction occurs, which reversal of shape will be maintained until the temperature has been substantially lowered. The materials and thickness of the component parts and the degree of curvature are so chosen that the disk will snap through when heated to the desired temperature (e. g. 200° F.) and will snap back at a lower temperature (e. g. 150° F.). Suitable materials are sheet brass and nickel steel having a thickness of .008" respectively and suitable cupping for a disk one inch in diameter is $1\frac{1}{32}$ inch.

It should be understood that the present invention is not limited to any particular combination of materials having different thermal coefficients of expansion or to any particular sized disk, but is intended to embrace in its scope any combination of materials having dissimilar thermal coefficients of expansion sufficient to cause the characteristic reversal of curvature. Furthermore, the two materials comprising the composite thermostatic sheet may be secured together in any desired manner by riveting, soldering, brazing or otherwise, although it is preferred to unite the materials comprising the sheet by welding or similar means to secure a substantially indivisible sheet.

From the foregoing it will be evident that in one aspect the invention involves a thermostatic device characterized by portions arranged to react upon each other with change of temperature to set up stresses the magnitude of which changes upon change of temperature, at least one of the portions being formed of different metals or other components having different coefficients of expansion, the device reaching a condition of instability at a predetermined temperature by virtue of the arrangement of said portions and as a result of the differential expansion of the components due to change of temperature, whereupon said stresses become effective to change abruptly the relative position of said portions.

As indicated in Fig. 1 in its cold position the thermostatic disk 14 curves upwardly thereby seating the valve 11 and permitting a small amount of oil to flow through the hollow bore of the valve and stem to the shaft 10. Should the bearing become heated under the influence of greater load on the shaft or for other reasons, such heat will be transmitted to the disk 14 which after being heated to a predetermined temperature abruptly snaps to a downwardly cupped position shown in Fig. 2. In this position the valve 11 is unseated and oil may flow through the opening 11' and through the perforations 14' in the disk as well as through the hollow bore of the valve and valve stem. In this manner an increased amount of oil is supplied to the bearing to compensate for the additional load imposed thereon. The disk remains in this position until the temperature drops to a predetermined degree when it abruptly changes shape to seat the valve and reduce the oil supply. The action of the disk 14 is decidedly abrupt in either direction so that the flow of oil is instantaneously controlled according to the bearing temperature. Thus an increased or diminished quantity of oil is automatically supplied as required and liability of waste is eliminated. Furthermore if the normal passageway of the oil cup becomes clogged, as sometimes occurs in all oil cups owing to the small passageway required to supply the oil slowly, consequent overheating of the bearing actuates the disk to admit oil in sufficient quantity quickly to cool the bearing.

The normal flow of oil through the valve 11 and valve stem 13 is regulated by a needle valve 17 which is arranged to extend into the valve. The outer end of the valve 17 is threaded into a boss 18, a lock nut 19 being provided to lock the valve in the desired position.

A cardinal feature of the invention consists in that temperature controlled means are provided for automatically regulating the passage of fluid through a conduit. Preferably the action is instantaneous and abrupt so that the flow is immediately stopped or started according to the requirements of service.

I claim:

1. A lubricating device for bearings comprising a receptacle having an outlet, means for restricting the flow of oil through said outlet, and snap action temperature controlled means responsive to the bearing temperature connected to said last means for automatically and instantaneously augmenting the flow when the temperature reaches a predetermined point.

2. A lubricating device for bearings comprising a receptacle having an outlet, a valve controlling said outlet constructed to permit when seated a restricted flow of oil therethrough, and snap action thermostatically controlled means responsive to the bearing temperature instantaneously and completely to unseat said valve when the temperature reaches a predetermined point thereby to augment the flow of oil through said outlet.

3. A lubricating device for bearings comprising a receptacle having an outlet, a valve having a hollow bore to control said outlet but permitting flow of oil through the hollow bore when seated, and a thermostatic member connected to said valve for unseating the valve when the temperature reaches a predetermined point.

4. A lubricating device for bearings comprising a receptacle having an outlet, a valve to control said outlet having a hollow bore thus to permit a restricted flow of oil when seated, and a perforated thermostatic member to unseat said valve when the temperature reaches a predetermined point thereby to permit increased flow of oil from the receptacle through the perforations in said member.

5. A lubricating device having an outlet, a valve to control said outlet, a hollow stem connected to said valve, a thermostatic disk connected to said stem normally to hold said valve seated and constructed abruptly to unseat the latter when the temperature reaches a predetermined point.

6. A lubricating device for bearings comprising a casing having an outlet, a valve to control said outlet, a hollow stem connected to said valve, and a perforated thermostatic disk responsive to the bearing temperature connected to said stem, constructed to unseat said valve when the temperature arrives at a certain predetermined point.

7. A lubricating device for bearings comprising a casing having an outlet, a valve to control said outlet, a hollow stem connected to said valve through which oil normally flows, a perforated thermostatic disk connected to said stem to unseat said valve when the temperature reaches a predetermined degree, and means for controlling the flow of oil through said stem.

8. In a device of the class described, a receptacle having an outlet, a valve controlling said outlet, and snap action thermostatic means for instantaneously opening and closing said valve when the temperature passes predetermined points.

9. In a device of the class described, a receptacle having an outlet, a valve controlling said outlet, and a snap action thermostatic disk automatically and instantaneously to unseat and seat said valve at different predetermined temperatures.

10. In a device of the class described, a receptacle having an outlet, a valve to control said outlet, and a perforated thermostatic disk to unseat said valve when the temperature attains a predetermined degree thereby to permit the passage of fluid through the perforations in the disk.

11. In a device of the class described, a member having a fluid passage, a valve controlling said passage, a stem having a hollow bore connected to said valve, and a perforated thermostatic disk connected to said stem, restricted flow being normally permitted through said bore and said disk being constructed automatically to unseat said valve when the temperature reaches a predetermined degree thereby to augment the flow through said passage.

12. A device of the character described comprising a casing having a fluid passageway therethrough, a valve for closing said passageway, and a thermostatic device in heat transfer relation to the fluid in said passageway for controlling said valve, said device comprising a plurality of united components having different coefficients of expansion, said components being normally flexed in one direction and tending to flatten in response to temperature change in one sense, thereby setting up stresses which oppose said tendency, until a predetermined temperature is reached, the stresses then changing the flexure.

13. A device of the character described comprising a casing having a fluid passageway therethrough, a valve for closing said passageway, and a thermostatic sheet in heat transfer relationship to the fluid in said passageway for controlling said valve, said sheet being cupped with different coefficients of expansion on opposite sides, the peripheral portion of the sheet being adapted to be stressed by differential expansion of the opposite sides of the sheet until a predetermined temperature is reached, whereupon the stresses become effective abruptly to reverse the curvature of the sheet thereby seating or unseating said valve in accordance with the temperature of the fluid in said passageway.

14. A device of the character described comprising a casing having a fluid passageway therethrough, a valve for closing said passageway, and a thermostatic device in heat transfer relation to the fluid in said passageway for opening and closing said valve, said device comprising portions arranged to react upon each other with change of temperature to set up stresses the magnitude of which changes upon change of temperature, at least one of the portions being formed of components having different coefficients of expansion, the device reaching a condition of instability at a predetermined temperature by virtue of the arrangement of said portions and as a result of the change of temperature, whereupon said stresses become effective to change abruptly the relative position of said portions thereby to open and close said valve in accordance with the temperature of the fluid in said passageway.

Signed by me at Cambridge, Massachusetts this second day of October 1924.

JOHN A. SPENCER.